W. F. BOWERS.
COMPOSITE CONDUIT AND METHOD OF MANUFACTURING SAME.
APPLICATION FILED JUNE 14, 1911.

1,009,465.

Patented Nov. 21, 1911.

Witnesses:
Arthur L. Slee.
S. Constine.

Inventor:
W. F. Bowers
by N. A. Acker
his Atty.

UNITED STATES PATENT OFFICE.

WILLIAM F. BOWERS, OF SAN FRANCISCO, CALIFORNIA.

COMPOSITE CONDUIT AND METHOD OF MANUFACTURING SAME.

1,009,465.  Specification of Letters Patent.  Patented Nov. 21, 1911.

Application filed June 14, 1911. Serial No. 633,169.

*To all whom it may concern:*

Be it known that I, WILLIAM F. BOWERS, a citizen of the United States, residing in the city and county of San Francisco and State of California, have invented certain new and useful Improvements in Composite Conduits and Methods of Manufacturing Same, of which the following is a specification.

The present invention relates to a flexible conduit for the transportation of coal oil, gasolene and similar fluids, the object being to so construct the conduit as to provide against the fluid passing therethrough coming in direct contact with the rubber lining thereof and by so doing overcoming the scaling or flaking of the inner wall surface of the conduit and preventing the clogging of the same, while at the same time holding the interior rubber tube thereof in proper position with respect to its seamless textile lining by the application of an internal and external pressure applied thereto.

Where coal oil, gasolene, or similar fluid is permitted to come in direct flowing contact with the inner rubber surface of the conduit, the action of the fluid quickly disintegrates the rubber and causes a separation thereof. To overcome this action a wrapped fabric lining has been given to the rubber conduit, but practice has demonstrated that the flowing gaseous fluid being piped works beneath the seam of the wrapped lining and causes a separation of the layers of textile fabric, resulting in the unraveling thereof, a clogging of the conduit, and preventing the free flow of the fluid. In some instances, a flat metallic coil is inserted within the conduit to bear against the inner surface of the conduit to hold the rubber in position, but such applied pressure only partially solved the difficulty, inasmuch as the material intermediate the spirals of the coil give inwardly and gradually work from beneath the same.

To comprehend the present invention, reference should be had to the accompanying sheet of drawings, wherein—

Figure 1:
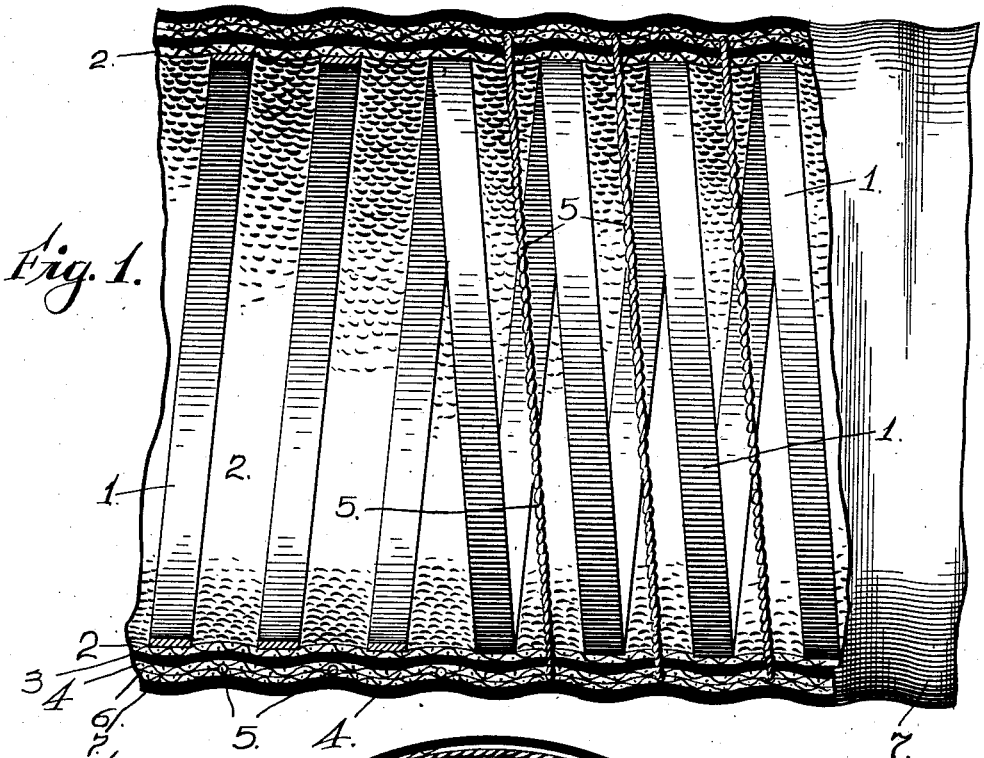
Figure 2:
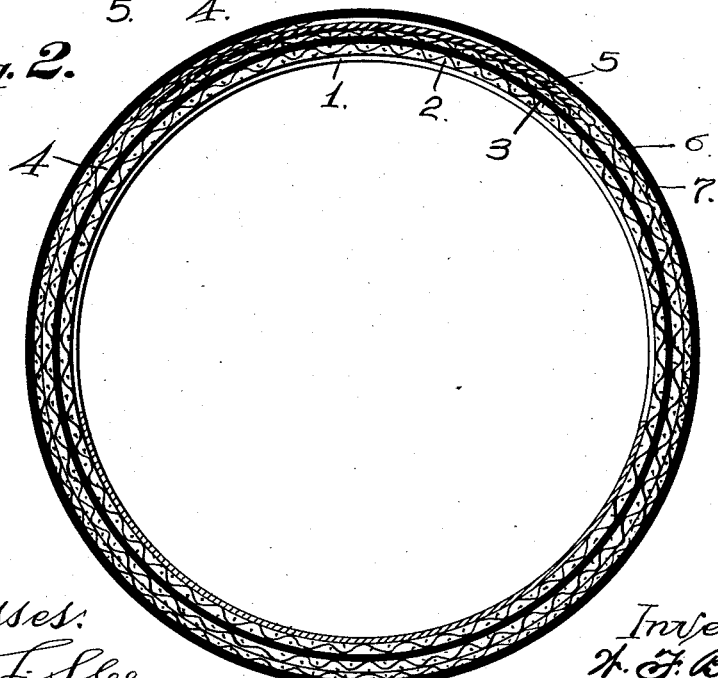

Figure 1 is a detail part broken view of a portion of the improved conduit. Fig. 2 is an end view of the conduit disclosing the arrangement of its elements.

In the drawings, the numeral 1 is used to designate an internal flat metallic coil of uniform diameter throughout extended the entire length of the conduit, 2 an inner seamless textile lining of friction cloth against the interior surface of which the metallic coil bears, 3 is a layer of oil resisting compound, such as balata, enveloping the inner textile lining, which compound covering is wrapped with one or more layers 4 of friction cloth, held thereto by a securing wire or cable 5 wound spirally thereon to lie within or intermediate the spirals of the metallic coil 1, so as to exert an inward pressure and present an outer reinforcement to the inner textile lining intermediate the spiral of the metallic coil 1, and by so doing holding in tension such portions of the lining as otherwise would stand out of compression. The internal and external compression strains as thus applied to the inner seamless textile lining maintain the same in tension, and prevent the buckling and working loose thereof relative to the layer or covering 3. The layer 4 is inclosed or embraced by an outer covering composed of a layer of textile fabric 6 and an outer layer 7 of rubber.

In the construction of the improved conduit the inner metallic coil 1 is formed on a suitable mandrel, and over the same is formed the inner seamless textile lining 2, which is incased within a layer or covering 3 of oil resisting compound. As the covering 3 is applied, the same is wrapped with the friction cloth 4 and compressed onto the lining 2 by the cable or wire 5 wound thereon so as to bear onto the material intermediate the spirals of the inner metallic coil 1, the textile wrapping 6 of friction cloth being then wound onto the partly constructed conduit, after which the outer rubber covering 7 is applied, and the conduit as thus constructed or built up is subjected to the usual vulcanizing process to unite the wrapped layers of textile fabric and the rubber layers. As thus constructed there is formed a strong, substantial, flexible conduit, one wherein delays in the use of the conduit incident to repeated stops being required in the flow of the fluid to repair worn surfaces thereof is avoided.

Having thus described the invention what is claimed as new and desired to be protected by Letters Patent is—

1. A flexible conduit for the described purpose, the same comprising an inner metallic coil, a seamless lining inclosing the same, an oil resisting compound enveloping said lining, a friction cloth covering for said enveloping compound, a metallic winding for the said cloth covering for compressing the enveloping compound onto the inner lining intermediate the spirals of the metallic coil, and an outer covering inclosing the inner metallic wrapping.

2. The method of forming a flexible conduit of the described character which consists in forming a metallic coil, inclosing the same with a seamless lining of friction cloth, enveloping said lining with an oil resisting compound, covering the same with a winding of friction cloth, reinforcing said covering with a metallic winding to compress the inner lining intermediate the spirals of the metallic coil, inclosing the metallic winding with a covering of friction cloth and rubber, and vulcanizing the conduit so formed.

In testimony whereof I have signed my name to this specification in the presence of two subscribing witnesses.

WILLIAM F. BOWERS.

Witnesses:
  N. A. ACKER,
  D. B. RICHARDS.

---

Copies of this patent may be obtained for five cents each, by addressing the "Commissioner of Patents, Washington, D. C."